(12) United States Patent
Stephenson

(10) Patent No.: US 7,997,096 B2
(45) Date of Patent: Aug. 16, 2011

(54) BAFFLE FOR HVAC SYSTEMS

(75) Inventor: Philip Stephenson, Dexter, MI (US)

(73) Assignee: Behr America, Inc., Troy, MI (US)

( * ) Notice: Subject to any disclaimer, the term of this patent is extended or adjusted under 35 U.S.C. 154(b) by 617 days.

(21) Appl. No.: 11/898,064

(22) Filed: Sep. 7, 2007

(65) Prior Publication Data
US 2009/0064694 A1 Mar. 12, 2009

(51) Int. Cl.
B60H 1/32 (2006.01)
B60H 3/00 (2006.01)

(52) U.S. Cl. ............... 62/186; 62/239; 62/244; 165/42; 165/135

(58) Field of Classification Search ............. 62/186, 62/239, 244, 296; 165/42, 43, 135; 237/12.3 A, 237/12.3 B; 454/906
See application file for complete search history.

(56) References Cited

U.S. PATENT DOCUMENTS

| 1,865,775 | A | 7/1932 | Martocello, Sr. | |
| 4,083,198 | A | 4/1978 | Dennis | |
| 5,620,367 | A | 4/1997 | Khelifa | |
| 6,692,223 | B2 * | 2/2004 | Ikeda et al. | 415/53.1 |
| 6,729,152 | B2 | 5/2004 | Gully et al. | |
| 6,739,388 | B2 * | 5/2004 | Nakagawa et al. | 165/202 |
| 6,974,376 | B2 * | 12/2005 | Yamaguchi et al. | 454/146 |
| 2005/0061026 | A1 | 3/2005 | Choi | |
| 2005/0229615 | A1 * | 10/2005 | Nakamura | 62/186 |
| 2006/0070387 | A1 * | 4/2006 | Yamaguchi et al. | 62/244 |
| 2009/0013706 | A1 * | 1/2009 | Sato et al. | 62/239 |

FOREIGN PATENT DOCUMENTS

| DE | 77 39 556 U1 | 4/1979 |
| DE | 43 36 822 A1 | 5/1995 |
| DE | 43 38 099 C2 | 5/1995 |
| DE | 44 08 796 A1 | 9/1995 |
| DE | 101 21 286 A1 | 10/2002 |
| DE | 10121286 A1 * | 10/2002 |
| DE | 202 17 506 U1 | 1/2003 |
| DE | 101 35 778 A1 | 2/2003 |
| DE | 101 47 759 A1 | 4/2003 |
| DE | 203 09 978 U1 | 9/2003 |
| DE | 10 2004 017 616 A1 | 10/2005 |
| EP | 0 968 857 B1 | 1/2000 |
| EP | 1 101 640 A | 5/2001 |
| EP | 1 273 465 A | 1/2003 |
| EP | 1 437 246 B1 | 7/2004 |
| JP | 2005-98665 A | 4/2005 |

OTHER PUBLICATIONS

Umeda et al. from Experiments in Fluids 26 (1999) 389-396 Copyright Springer-Verlag 1999. Retrieved from: http://www.springerlink.com/content/t95lyfut9hb8umev/ on Dec. 7, 2010.*

* cited by examiner

Primary Examiner — Frantz F Jules
Assistant Examiner — Daniel C Comings
(74) Attorney, Agent, or Firm — Muncy, Geissler, Olds & Lowe, PLLC

(57) ABSTRACT

A vehicle HVAC system comprises an evaporator, a heater core, a variable airflow control device, and a baffle positioned downstream of the evaporator. The baffle has a geometrical configuration, e.g., apertures sufficient to prevent the formation of vortex like airflow patterns near the downstream side of the baffle when the HVAC system is in use.

22 Claims, 2 Drawing Sheets

BAFFLE FOR HVAC SYSTEMS

BACKGROUND

The present application relates to vehicle heating, ventilation and air conditioning (HVAC) systems. In particular, the present application relates to an air flow control member used to influence air flow through a vehicle HVAC system.

Vehicle HVAC systems may include cabin controls that are used by a vehicle occupant to control the output temperature and airflow of the air being delivered into the vehicle cabin from the HVAC system. It may be desirable to configure an HVAC system to provide a linear relationship between the position of a temperature controller and the output temperature. For example, when the controller is in a position half way between the coldest and hottest settings, the output temperature may be about half way between the coldest and hottest output temperatures. One way of increasing the linearity of the relationship between controller position and output temperature is to position a baffle in the air flow to adjust the airflow characteristics of the system. In some systems that utilize a pivoting temperature door to direct a portion of the air flow over a heater core, a baffle may be positioned in the arc of the temperature doors travel as it moves from one setting to another.

Such HVAC systems often drive air over an evaporator in which compressed refrigerant is flashed and have the baffle positioned downstream from the evaporator. The heat in the air is transferred to the evaporating refrigerant in the evaporator, thereby cooling the air. As the air is cooled, water in the air may condense forming small droplets, like a mist, in the air stream. When the air stream containing the small water droplets passes around a baffle, the small droplets may accumulate on the downstream side of the baffle in a region of turbulent or vortex like air flow. In this area, the small droplets may agglomerate and form larger drops as the air moves through the HVAC system. The larger drops may be carried by the air flow and out of vents into the passenger compartment of a vehicle.

It would be advantageous to provide an HVAC system having a linear control relationship between the position of the temperature control and the output temperature.

SUMMARY

One embodiment of the invention relates to a vehicle HVAC system comprising an evaporator, a heater core, a variable airflow control device, and a baffle positioned downstream of the evaporator. The baffle may be provided with a geometric configuration, preferably including apertures, configured to prevent the formation of vortex like airflow patterns near a downstream side of the baffle when the HVAC system is in use.

Another embodiment relates to a method of regulating airflow through a vehicle HVAC system, comprising providing a variable airflow control device, and providing a structure, preferably a baffle, within an air flow region of the vehicle HVAC system. The baffle may be provided with a geometric configuration, e.g., comprising apertures, configured to prevent the formation of vortex like airflow patterns near a downstream side of the baffle when the HVAC system is in use.

DETAILED DESCRIPTION OF THE PREFERRED EMBODIMENTS

Figure 1:
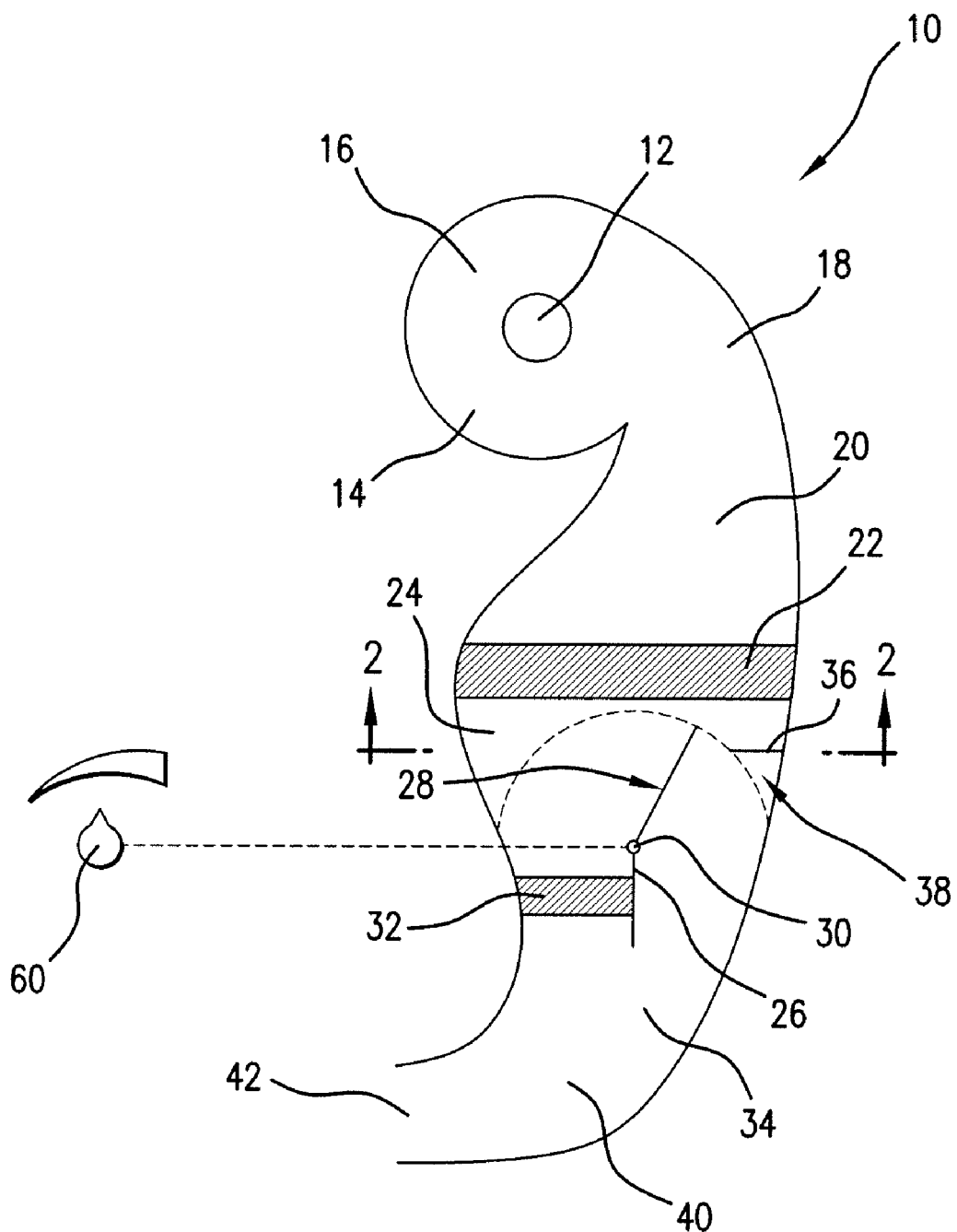
FIG. 1 is a schematic view of a vehicle HVAC system.

Referring to FIG. 1, a vehicle heating ventilation and air conditioning system (HVAC) 10 includes a blower motor 12, a housing 14 and a blower scroll 16. Blower motor 12 draws air into the system and pushes it through the HVAC system before it exits into a vehicle passenger compartment. Air exits blower scroll 16 through an outlet 18 and into a channel 20. The air then passes over evaporator 22 where it may be cooled when the HVAC system is operating in an air conditioning mode. In some embodiments, channel 20 may have an increasing cross sectional area as the air flow approaches evaporator 22. This allows for a slower linear velocity of the air as it passes over the evaporator, thereby increasing residence time through the evaporator and optimizing efficiencies. After exiting evaporator 22, the air flow enters passage 24. Passage 24 may be divided by a wall 26. Air flow is directed to either side of wall 26 by a variable airflow control device, e.g., shown as temperature door 28 which pivots about pivot point 30. On one side of wall 26, all or part of the air may pass over heater core 32 where the air is warmed prior to exiting the HVAC system. Another portion or all of the air may also be directed around to bypass heater core 32 through passage 34.

The user interface, such as a knob or dial 60, located in the passenger compartment may be used to control the position of the temperature door 28, thereby effecting the portion of the air flowing over heater core 32. In many vehicle applications, it is desirable to have a linear relation between the position of the knob or dial and the output airflow temperature. However, the geometries of the passageways, heater core temperature door, and other structures associated with HVAC system 10 may result in a non-linear relationship. The inclusion of an appropriately shaped structure, such as baffle 36, at a point downstream of evaporator 22, and before the temperature door 28, can partially obstruct and direct the air flow, resulting in a more linear relationship between the knob or dial position and the output temperature. In some embodiments, it may be desirable to place baffle 36 at least partially in the arc of temperature door 28.

While the presence of baffle 36 may increase the linearity of the relationship between the position of a temperature control element, such as dial 60, and the output temperature, turbulent airflow can result in vortex like patterns in the region 38 immediately downstream of baffle 36. When HVAC system 10 is operated in the air conditioning mode, cool air exiting evaporator 22 may include condensed water particles. As the air flow passes baffle 36 some of this condensed water vapor may become entrained in region 38 in the vortex like air pattern. Droplets of condensation may agglomerate and form on the downstream side of baffle 36 and migrate up to the top edge of baffle 36. When droplets reach this point they may enter the air stream and be carried through passage 34 down to region 40 where the air streams from both sides of temperature door 28 are combined before exiting the HVAC system at outlet 42 and entering the vehicle compartment. (In some embodiments after exiting outlet 42 the air flow may be directed through additional ducting or channels to various points within the vehicle passenger compartment.) These water droplets may exit the outlet 42 in the form of a spray or mist that is not desired by vehicle occupants.

Baffle 36 can be provided with any physical configuration that is sufficient to maintain the linearity of the temperature control device (e.g., temperature setting knob) while at the same time preventing formation of vortex like flow patterns downstream of the baffle that are significant enough to entrain water droplets. In one preferred embodiment, the baffle 36 may include pores or apertures that allow sufficient air flow through the baffle to prevent the forming of vortex like air patterns in region 38 while still obstructing enough flow to increase the linearity of the relationship between the temperature setting dial position and the output temperature. While shown as a baffle, any other suitable structure may be used to increase linearity in the relationship between the controller position and the output temperature, e.g., a reticulated structure.

Figure 2:
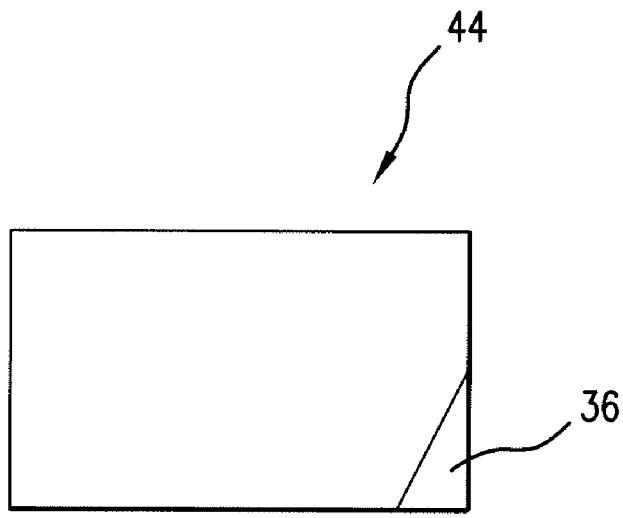
FIG. 2 is a cross-sectional view of the vehicle HVAC system of FIG. 1 taken long line 2-2.
Figure 3:
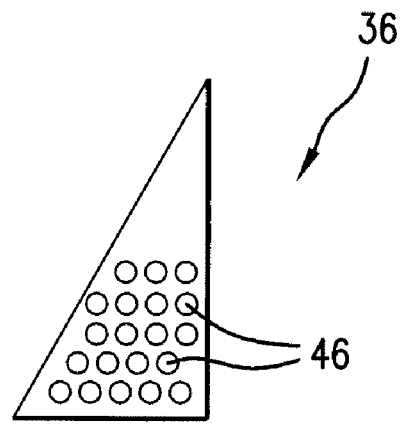
FIG. 3 is an elevation view of a baffle for inclusion in the HVAC system of FIG. 1.

Referring to FIGS. 2 and 3, cross-sectional area 44 is taken along line 2-2 in FIG. 1. One exemplary design of baffle 36 is shown in the lower right corner of cross-sectional area 44. While the size and shape of baffle 36 relative to cross-sectional area 44 is shown for a particular embodiment, a number of different configurations may be used, depending upon the HVAC system and the particular vehicle. Baffle 36 preferably includes a plurality of pores or apertures 46 formed therethrough. The size of pores or apertures 46 is sufficiently large to allow enough air flow to prevent the formation of vortex like air patterns on the downstream side of baffle 36. Pores 46 may be either circular or non-circular, preferably being between about 1 to 8 mm in diameter. More preferably, pores 46 may be between about 3 and 7 mm or even more preferably about 4 to 6 mm in diameter. Alternative and/or mixed pore sizes and/or shapes may be used to optimize airflow characteristics, depending upon the specific geometry of the HVAC flow system in which the baffle is installed.

In some embodiments, the total cross sectional area of the pores 46 may be between one-tenth and one-half of the area defined by the sides of baffle 36. Preferably, the total cross-sectional area of pores 46 may be between one-fourth and one-third of the total area defined by the sides of baffle 36 (i.e., one-quarter to one-third of the cross sectional area of baffle 36 would be open to air flow). It has been determined that such baffles allow adequate air flow to prevent the downstream formation of vortex like air patterns while still restricting the air flow sufficiently to increase the linear relationship between the control dial or knob position and the output temperature. Optimally, vortex like air patterns are prevented to the degree that they permit the agglomeration of water droplets that could then be entrained in the airflow and be carried out of a vent and into the passenger cabin of the vehicle.

Baffle 36 may be formed as a single unitary body with the housing of HVAC system 10 by a molding process. In such embodiments, pores 46 may be formed during the molding process, or they may be formed by perforating baffle 36 after the housing of HVAC system 10 has been formed. Alternatively, baffle 36 may be formed separately from the housing of the HVAC system 10. In such embodiments, the pores 46 may be formed when baffle 36 is molded or otherwise manufactured. Alternatively, pores 46 may be formed during a separate manufacturing process. Baffle 36 may then be positioned in HVAC system 10 by fasteners, adhesives, or other suitable means for attachment. Alternatively, if the housing of HVAC system 10 and baffle 36 are made of suitable materials, e.g., polymeric materials, baffle 36 may be coupled to the housing of HVAC system 10 by ultrasonic welding or other method.

Figures 4, 5:
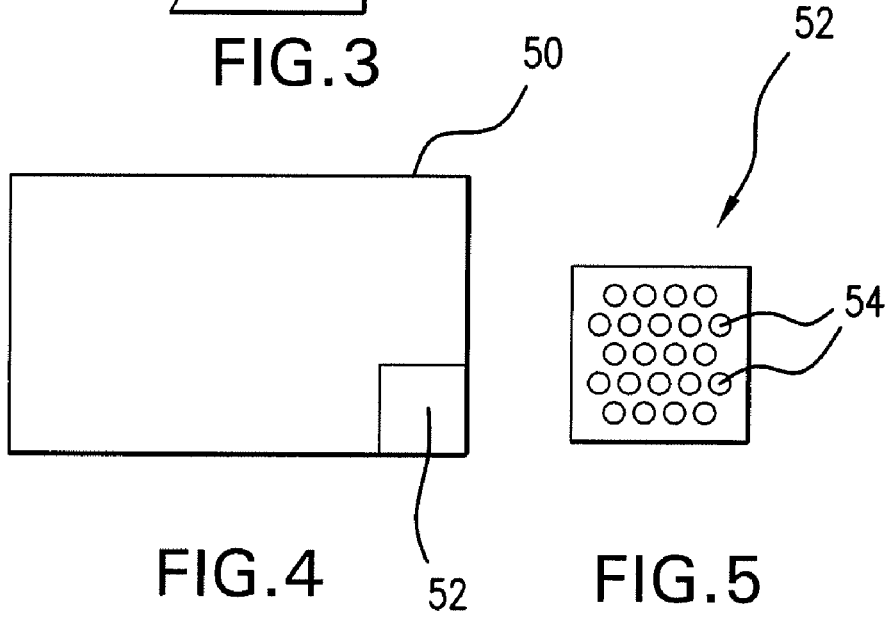
FIG. 4 is a cross-sectional view of a vehicle HVAC system according to an alternative embodiment.
FIG. 5 is an elevation view of a baffle for inclusion in the HVAC system of FIG. 4.

Referring to FIGS. 4 and 5, cross sectional area 50 is taken along line 2-2 in FIG. 1. Baffle 52 is shown in the lower right corner of cross sectional area 50. While the size and shape of baffle 52 relative to cross sectional area 50 is shown for a particular embodiment, a number of different configurations may be used depending upon the HVAC system and the particular vehicle. Baffle 52 includes a plurality of pores or apertures 54 formed therethrough. The size of the pores or apertures 54 is sufficiently large to allow enough air flow to prevent the formation of vortex like air patterns on the downstream side of baffle 52. Preferably, the total cross sectional area of the pores 54 may be between one-tenth and one-half of the area defined by the sides of baffle 52. In other embodiments, the total cross sectional area of pores 54 may be between one-fourth and one-third of the total area defined by the sides of baffle 52 (i.e. one-quarter to one-third of the cross sectional area of baffle 36 would be open to air flow). Obviously, many other shapes of baffle are possible for both baffle number 52 as well as for the apertures contained in the baffle number.

Although the foregoing has been described with reference to exemplary embodiments, workers skilled in the art will recognize that changes may be made in form and detail without departing from the spirit and scope thereof. For example, although different example embodiments may have been described as including one or more features providing one or more benefits, it is contemplated that the described features may be interchanged with one another or alternatively be combined with one another in the described example embodiments or in other alternative embodiments. The present subject matter described with reference to the example embodiments and set forth in the following claims is manifestly intended to be as broad as possible. For example, unless specifically otherwise noted, the claims reciting a single particular element also encompass a plurality of such particular elements. Many other changes and modifications may be made to the present invention without departing from the spirit thereof. The scope of these and other changes will become apparent from the appended claims. The steps of the methods described herein may be varied, and carried out in different sequences.

What is claimed is:

1. A vehicle HVAC system comprising:
   an evaporator;
   a heater core;
   a variable airflow control device; and
   a baffle downstream of the evaporator and upstream of the heater core;
   wherein the baffle comprises a plate member containing a plurality of apertures and is being configured to prevent the formation of vortex-like airflow patterns near a downstream side of the baffle, when the HVAC system is in use,
   wherein the variable airflow control device comprises a pivoting temperature door, and the baffle is placed proximate to an arc of travel traced by the temperature door as it moves from one position to another, and
   wherein the plate member projects from a wall and includes a free edge around which air can flow.

2. The vehicle HVAC system of claim 1, wherein the apertures comprise about one-tenth to one-half of the cross-sectional area of the baffle.

3. The vehicle HVAC system of claim 2, wherein the apertures comprise about one-fourth to one-third of the cross-sectional area of the baffle.

4. The vehicle HVAC system of claim 1, wherein the apertures have an average diameter between about 2 and 8 mm.

5. The vehicle HVAC system of claim 4, wherein the apertures have an average diameter between about 3 and 7 mm.

6. The vehicle HVAC system of claim 1, wherein the baffle plate member has an approximately triangular shape.

7. A method of regulating airflow through a vehicle HVAC system that includes an evaporator, a heater core, a variable airflow control device and a baffle within an air flow region downstream of the evaporator, the baffle projecting from a wall of the HVAC system and having a free edge, the method comprising:

passing a stream of air exiting the evaporator past the baffle which has a geometrical configuration sufficient to prevent the formation of vortex like airflow patterns near the downstream side of the structure when the HVAC system is in use, wherein the size and shape of the baffle is selected to provide a generally linear relationship between a series of set positions of a manual controller and an output temperature of the HVAC system at each of said set positions, respectively.

8. The method of claim 7, wherein the variable airflow control device comprises a pivoting temperature door, and the baffle is placed proximate to an arc of travel traced by the temperature door as it moves from one position to another.

9. The method of claim 7, wherein the baffle comprises a plate member containing a plurality of apertures.

10. The method of claim 9, wherein the apertures comprise about one-tenth to one-half of the cross-sectional area of the baffle.

11. The method of claim 10, wherein the apertures comprise about one-fourth to one-third of the cross-sectional area of the baffle.

12. The method of claim 9, wherein the apertures have an average diameter between about 2 and 8 mm.

13. The method of claim 12, wherein the apertures have an average diameter between about 3 and 7 mm.

14. The method of claim 9, wherein the baffle plate member has an approximately triangular shape.

15. A vehicle HVAC system comprising:

an airflow passage leading from a blower system toward a passenger compartment, said airflow passage including a heater duct and a bypass duct bypassing said heater duct;

an evaporator in said airflow passage;

a heater core in said heater duct;

a variable airflow control device comprising a flap in said airflow passage between said evaporator and said heater core, said flap being movable from a first position to a second position to affect a relative amount of airflow passing into said heater duct and said bypass duct; and a baffle in said airflow passage between said evaporator and said bypass duct for affecting an amount of airflow through said bypass duct, said baffle including a plurality of apertures configured to reduce vortex-like airflow patterns on a downstream side of said baffle, wherein the baffle projects from a wall of the airflow passage into the airflow passage and includes an unsupported free end in the airflow passage spaced from the wall.

16. The vehicle HVAC system of claim 15, wherein said flap includes a free end and said free end defines an arc of travel as said flap moves from said first position to said second position, said baffle including a portion lying on said arc of travel.

17. The vehicle HVAC system of claim 15, wherein said heater core is located downstream of said evaporator.

18. The vehicle HVAC system of claim 15, wherein said heater duct is located on a first side of said airflow passage and said bypass duct and said baffle are located on a second side of said airflow passage.

19. The vehicle HVAC system of claim 15, wherein the size and shape of said baffle are selected to provide a generally linear relationship between a series of set positions of a manual controller and an output temperature of the HVAC system at each of said set positions.

20. A method of regulating airflow through a vehicle HVAC system, the vehicle HVAC system including:

an airflow passage leading from a blower system to a passenger compartment, the airflow passage including a heater duct and a bypass duct bypassing the heater duct;

an evaporator in the airflow passage;

a heater core in the heater duct; and a variable airflow control device comprising a flap in the airflow passage between the evaporator and the heater core, the flap being movable from a first position to a second position to affect a relative amount of airflow passing into the heater duct and the bypass duct, said method comprising:

mounting a baffle having a plurality of apertures in the airflow passage downstream of the evaporator and upstream of the bypass duct; and adjusting a position of the flap relative to the baffle to affect the relative amounts of airflow through the heater duct and through the bypass duct, wherein said step of mounting the baffle comprises mounting the baffle such that the baffle projects from a wall of the airflow passage into the airflow passage leaving an edge of the baffle unsupported in the airflow passage.

21. The method of claim 20, wherein said step of mounting the baffle in the airflow passage comprises mounting the baffle in a position that contributes to a generally linear relationship between a series of set positions of a manual controller and an output temperature of the HVAC system at each of the set positions.

22. The method of claim 20, including driving an airflow through the evaporator toward the bypass duct such that a first portion of the airflow impinges against the baffle and a second portion of the airflow passes around the unsupported edge of the baffle.

* * * * *